United States Patent Office 3,417,122
Patented Dec. 17, 1968

3,417,122
IMIDATE ESTERS AND AMIDINES AND THE SALTS THEREOF
James M. McManus, Gales Ferry, Conn., assignor to Chas. Pfizer & Co., Inc., New York, N.Y., a corporation of Delaware
No Drawing. Original application Aug. 7, 1963, Ser. No. 300,690, now Patent No. 3,344,138, dated Sept. 26, 1967. Divided and this application July 27, 1966, Ser. No. 576,167
5 Claims. (Cl. 260—453)

This application is a divisional application of application Ser. No. 300,690 as filed Aug. 7, 1963 and now U.S. Patent No. 3,344,138.

The invention described in this application relates to a novel process for preparing known therapeutic agents. More particularly, it is concerned with a novel method of preparing various 1,2,4-benzothiadiazine-1,1-dioxide compounds which have previously been reported to be useful as diuretic agents. The invention also includes various novel intermediate useful for this reaction within its scope.

The novel process of this invention comprises essentially the reatcion or a 4-substituted -6-fluoro-1,3-disulfamyl-benzene compound of the formula:

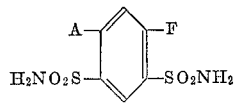

wherein A is a member selected from the group consisting of hydrogen, chlorine, bromine, nitro, trifluoromethyl, loyer alkyl and lower alkoxy, with an imidate ester or amidine of the formula:

wherein X is a member selected from the group consisting of lower alkoxy (preferably containing up to three carbon atoms) and amino, and Z is a member selected from the group consisting of hydrogen, alkyl containing up to six carbon atoms, lower fluoroalkyl and lower chloroalkyl, cycloalkyl containing up to five carbon atoms, bicyclo[2.2.1]hept-5-en-2-yl, bicyclo[2.2.1]hept-2-yl, phenyl, lower phenylalkyl, cycloalkylalkyl containing up to nine carbon atoms and —(CH$_2$)$_n$SR where $n$ is an integer in the range of 1–3, inclusive, and R is a member chosen from the group consisting of lower alkyl and lower alkenyl, lower fluoroalkyl and lower chloroalkyl, cycloalkyl containing up to six carbon atoms, α-naphthyl, β-naphthyl, benzyl monochlorobenzyl, mono (lower alkoxy)benzyl, β-phenylethyl and m-xylyl. This particular reaction is preferably conducted in a reaction-inert polar organic solvent at a temperature that is in the range of from about 20° C. up to about 150° C. for a period of about four to about thirty-six (36) hours. Preferred reaction-inert polar organic solvents in this connection include such N,N-di(lower alkyl) lower alkanoamides as dimethylformamide, diethylformamide, di(n-propyl)formamide, dimethylacetamide, diethylacetamide, dimethylpropamide, di(n-propyl)propamide, dimethylbutyramide and the like, as well as various lower dialkyl ethers of lower alkylene glycols like dimethoxyethane, di(n-propoxy)ethane, 1,2-dimethoxybutane and so on, and also various lower dialkyl sulfoxides and sulfones such as dimethyl sulfoxide, diethyl sulfone, di-isopropylsulfoxide and di-n-propylsulfone, etc. In general, it only necessary to use at least an equimolar amount of imidate ester or amide reagent with respect to the 6-fluoro-1,3-disulfamylbenzene starting compound in order to effect this reaction in a most desirable manner, but an excess of one or the other is not harmful in this respect and in some instances, may even be beneficial, particularly in the case where the more readily available starting material is the one to be used in excess. For instance, the imidate ester or amidine reagent may be used up to a one molar excess in order for optimum results to be achieved. Nevertheless, substantially equimolar amounts of 6-fluoro-1,3-disulfamylbenzene starting material and imidate ester or amidine reagent will generally suffice in this respect.

In accordance with a preferred embodiment of the method of this invention, the reaction mixture obtained as described above is thereafter treated with at least one molar equivalent amount of a base compound with respect to the 6-fluoro-1,3-disulfamylbenzene starting material, said base compound being selected from the group consisting of alkali metal hydroxides and alkaline-earth metal hydroxides, at a temperature that is in the range of from about 20° C. up to about 100° C. for a period of about one to about 24 hours. The reason for this base treatment step is to be certain that the reaction has gone to completion. However, it is not absolutely necessary and good yields can be obtained without it. Usually, in employing it, it is desirable to use up to a 50% molar excess of the base compound and to carry out the treatment in the presence of an aqueous solvent medium.

Recovery of the desired therapeutic products produced by the process of the present invention is carried out in accordance with standard, conventional procedure such as, for example, by employing such methods as concentration of the reaction mixture, preferably under reduced pressure, and crystallization of the resulting residue or concentrate therefrom. This step is usually only performed after the aforesaid reaction mixture has been first diluted with water. In the case where the reaction mixture has also undergone the aforementioned base treatment step after completion of reaction, it is only necessary to neutralize same with sufficient acid in order to obtain the desired benzothiadiazine dioxide from the reaction mixture in crystalline form.

The 4-substituted -6-fluoro-1,3-disulfamylbenzene starting materials required for the process of this invention are, for the most part, known compounds or else they can easily be prepared by those skilled in the art from readily available materials via the standard techniques of organic chemistry. For instance, they can be prepared from the corresponding m-substituted fluorobenzenes by merely treating them with an excess of the required amount of chlorosulfonic acid in the presence of thionyl chloride as the dehydrating agent, followed by subsequent treatment of the resulting disulfonyl chloride with either ammonia or concentrated ammonium hydroxide.

The imidate ester or amidine reagents, on the other hand, including their acid addition salts, all new compounds in the case of those reagents which have a sulfur-containing side chain as represented by the following structural formula:

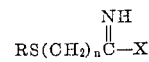

wherein R, $n$ and X are all as previously defined. All these compuonds, both old and new, are prepared by standard methods from the corresponding nitriles which, on treatment with the desired lower alkanol, yield the imidate esters thereof, i.e., lower alkyl imidates where X in the above formula is lower alkoxy. Subsequent treatment of these latter compounds with ammonia then yields the corresponding amidines. The nitriles (ZCN), in turn, can be prepared by any number of standard procedures, if necessary, i.e., if not available commercially, usually starting from the corresponding amide compounds (ZCONH$_2$).

As previously indicated, the therapeutic products prouced by the process of the present invention are all active oral diuretic agents useful in the treatment of patients afflicted with this condition (diuresis), in addition to being useful in the treatment of cases of hypertension as well. The most outstanding member of this series, which is produced directly by the process of this invention, is 3 - benzylthiomethyl - 6 - chloro - 7 - sulfamyl - 1,2,4-benzothiadiazine-1,1-dioxide. This particular compound is known generically as benzthiazide and is currently being marketed both here and abroad as a prescription item under various trademark names. It is also claimed by W. M. McLamore et al. in United Kingdom Patent No. 909,687.

The products produced by the process of this invention can be reduced either catalytically or else by the borohydrides to yield the corresponding 3,4-dihydro compounds. Alkylation of these latter compounds by the method of C. J. Buck et al., as described in Canadian Patent No. 659,439, then affords the corresponding 2-alkyl - 7 - sulfamyl - 3,4 - dihydro - 1,2,4 - benzothiadiazine-1,1-dioxides. In this manner, a compound such as 2-methyl - 3 - (2,2,2 - trifloroethyl)thiomethyl - 6 - chloro-7 - sulfamyl - 3,4 - dihydro - 1,2,4 - benzothiadiazine - 1,1-dioxide or polythiazide, which is claimed in U.S. Patent No. 3,009,911, can be obtained. This particular compound happens to be the most outstanding oral diuretic of its type in the field and is currently being marketed in this country for such purposes as a prescription item, in addition to being an antihypertensive agent as well, under the trademark "Renese."

This invention is further illustrated by the following examples, which are not to be construed in any way as imposing limitations upon the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

EXAMPLE I

To a solution of 32.6 g. (0.2 mole) of S-benzylthioacetonitrile and 10.13 g. (0.22 mole) of ethanol in 40 ml. of anhydrous diethyl ether at 0° C., there were added 8.03 g. (0.22 mole) of dry hydrogen chloride gas which was passed through the mixture over a period of two and one-half hours. The resulting reaction solution was then allowed to stand at room temperature (25° C.) for about 16 hours, at the end of which time it was subsequently concenrtated in vacuo to one-half of its original volume and treated with a fresh portion of diethyl ether. The precipitate which formed at this point was filtered and dried at room temperature to give 47 g. (96%) of ethyl S-benzylthioacetimidate hydrochloride, M.P. 101–102° C.

Twenty-four and one-half grams (24.5 g., 0.1 mole) of the above compound were then placed in 50 ml. of cold water containing 13.8 g. (0.1 mole) of potassium carbonate and the mixture was stirred constantly with great agitation. The oil which soon separated was then extracted with 100 ml. of diethyl ether, and the ether solution dried over anhydrous sodium sulfate and filtered. Upon evaporation of the ether from the resultant filtrate under reduced pressure there were obtained 21 g. of ethyl S-benzylthioacetimidate as the residual concentrate in the form of an oil.

EXAMPLE II

The procedure described in Example I is followed to prepare the following compounds from the appropriate nitrile and lower alkanol starting materials, using the same molar proportions throughout in each instance:

methyl S-methylthioacetimidate
ethyl β-[S-(n-propyl)thio]propionimidate
isopropyl γ-(S-vinylthio)butyrimidate
n-propyl S-allylthioacetimidate
isobutyl β-[S-(2,2,2-trifluoroethyl)thio]propionimidate
n-butyl γ-(S-chloromethylthio)butyrimidate
n-hexyl γ-(S-cyclopropylthio)butyrimidate
methyl S-cyclobutylthioacetimidate
ethyl β-(S-cyclohexylthio)propionimidate
isopropyl γ-[S-(α-naphthyl)thio]butyrimidate
n-propyl S-(β-naphthyl)thioacetimidate
methyl β-(S-benzythio)propionimidate
n-butyl γ-[S-(p-chlorobenzyl)thio]butyrimidate
ethyl S-(m-chlorobenzyl)thioacetimidate
methyl β-[S-(o-chlorobenzyl)thio]propionimidate
isoamyl S-(p-methoxybenzyl)thioacetimidate
ethyl γ-[S-(o-ethoxybenzyl)thio]butyrimidate
n-amyl β-[S-m-isopropoxybenzyl)thio]propionimidate
methyl γ-[S-(β-phenylethyl)thio]butyrimidate
ethyl S-(m-xylyl)thioacetimidate
methyl S-ethylthioacetimidate

EXAMPLE III

To 73.5 g. (0.3 mole) of ethyl S-benzylthioacetimidate hydrochloride suspended in 20 ml. of ethanol were added 75 ml. of 0.59 N ethanolic ammonia solution (0.32 mole NH₃). The well-stirred mixture gradually became homogeneous, followed by the precipitation of a solid. The entire reaction mixture was then treated with diethyl ether, and the crystalline salt precipitate subsequently filtered and air-dried. In this manner, there were obtained 58.5 g. (90%) of S-benzylthioacetamidine hydrochloride, M.P. 154–155° C.

54.3 grams (0.25 mole) of the above compound were then dissolved in 150 ml. of cold water to which there was immediately added 15.7 g. of potassium hydroxide in 20 ml. of cold water. The resulting free base precipitated immediately. The mixture was then further diluted with 300 ml. of cold water and allowed to stir at room temperature for 15 minutes. The resulting solid precipitate was then filtered and dried at room temperature (~25° C.) over $P_2O_5$. In this manner, there were obtained 39 g. (87%) of S-benzylthioacetamidine, M.P. 93.5–95° C.

*Analysis.*—Calcd. for $C_9H_{12}N_2S$: C, 59.96; H, 6.71; N, 15.54. Found: C, 59.91; H, 6.89; N, 15.20.

EXAMPLE IV

The procedure described in Example III is followed to prepare the following amidines from the esters reported in Example II, using the appropriate molar amount of ammonia in each case:

S-methylthioacetamidine
β-[S-(n-propyl)thio]propionamidine
γ-(S-vinylthio)butyramidine
S-allylthioacetamidine
β-[S-(2,2,2-trifluoroethyl)thio]propionamidine
γ-(S-chloromethylthio)butyramidine
γ-(S-cyclopropylthio)butyramidine
S-cyclobutylthioacetamidine
β-(S-cyclohexylthio)propionamidine
γ-[S-(a-naphthyl)thio]butyramidine
S-(β-naphthyl)thioacetamidine
β-(S-benzylthio)propionamidine
γ-[S-(p-chlorobenzyl)thio]butyramidine
S-(m-chlorobenzyl)thioacetamidine
β-[S-(o-chlorobenzyl)thio]propionamidine
S-(p-methoxybenzyl)thioacetamidine
β-[S-(o-chlorobenzyl)thio]propionamide
γ-[S-(o-ethoxybenzyl)thio]butyramidine
γ-[S-(β-phenylethyl)thio]butyramidine
S-(m-xylyl)thioacetamidine
S-ethylthioacetamidine

EXAMPLE V

A solution consisting of 24 g. (0.155 mole) of S-(2,2,2-trifluoroethyl)thioacetonitrile in 7.36 g. (0.160 mole) of absolute ethanol was saturated at 0° C. with dry hydrogen chloride gas. The reaction mixture was then stirred in the cold for one hour, at which point excess hydrogen chloride gas was removed for the reaction mixture in vacuo. The solidified mass so obtained was then triturated with diethyl ether and filtered to afford 32.5 g. (89%) of ethyl S-(2,2,2-trifluoroethyl)thioacetimidate hydrochloride, M.P. 93–93.5° C.

*Analysis.*—Calcd. for $C_6H_{22}ClF_3NOS$: C, 30.32; H, 4.67; N, 5.89. Found: C, 30.37; H, 4.78; N, 6.04.

Fifteen grams (0.064 mole) of ethyl S-(2,2,2-trifluoroethyl)thioacetimidate hydrochloride were added to a cold solution of 8.85 g. (0.064 mole) of potassium carbonte in 30 ml. of water. The resulting solution was then immediately extracted with five-100 ml. portions of diethyl ether, and the ether extracts dried over anhydrous sodium sulfate, filtered and concentrated under reduced pressure to afford an oil. In this way, there were obtained 12.0 g. (94%) of ethyl S-(2,2,2-trifluoroethyl)thioacetimidate.

*Analysis.*—Calcd. for $C_6H_{10}F_3NOS$: C, 35.81; H, 5.01. Found: C, 35.85; H, 5.12.

EXAMPLE VI

The procedure described in Example V is followed to prepare the same compounds listed as products in Example II by merely employing the appropriate starting materials in each case. The yields obtained are of substantially the same order of magnitude as those afforded by the procedure of Examples I–II.

EXAMPLE VII

Fifteen grams (0.064 mole) of ethyl S-(2,2,2-trifluoroethyl)thioacetimidate hydrochloride were added to 18.7 ml. of 5.0 N ethanolic ammonia solution (0.068 mole $NH_3$), and the resulting mixture was allowed to stir in the cold for two hours. After standing for about 64 hours (over the weekend), the reaction mixture was treated with 200 ml. of diethyl ether and the precipitate which resulted was removed by filtration and air-dried to yield 12.2 g. (92%) of S-(2,2,2-trifluoroethyl)thioacetamidine hydrochloride M.P. 74–76.5° C.

*Analysis.*—Calcd. for $C_4H_8ClF_3N_2S$: C, 23.02; H, 3.86; N, 13.43. Found: C, 23.12; H, 3.79; N, 13.46.

Twelve grams (0.0575 mole) of the above compound were dusted into a solution consisting of 3.36 g. (0.06 mole) of potassium hydroxide dissolved in 20 ml. ice water. The resulting aqueous solution was then saturated with table salt (sodium chloride) and extracted with diethyl ether (ten 50-ml. portions). The combined ether extracts were then dried over anhydrous sodium sulfate, filtered and subsequently concentrated in vacuo to give 9.8 g. (99%) of S-(2,2,2-trifluoroethyl)thioacetamidine, M.P. 24–25° C.

EXAMPLE VIII

The procedure described in Example VII is followed to prepare the same compounds listed as products in Example IV by merely employing the appropriate starting materials in each case. The yields obtained are of substantially the same order of magnitude as those afforded by the procedure of Examples III–IV.

EXAMPLE IX

The hydrobromide salt of S-benzylthioacetamidine is prepared by dissolving the base compound in an aqueous solution containing an equivalent amount in moles of hydrobromic acid and then evaporating the resultant solution to incipient precipitation under reduced pressure.

Other acid addition salts of the new imidate ester and amidine reagents of this invention (including the hydrochloride salt of the compounds reported in Examples II and IV) are prepared by this same procedure only employing hydrochloric acid, sulfuric acid, phosphoric acid, nitric acid, benzenesulfonic acid and p-toluenesulfonic acid instead.

EXAMPLE X

A solution consisting of 2.89 g. (0.01 mole) of 4-chloro-6-fluoro-1,3-disulfamylbenzene and 2.09 g. (0.01 mole) of ethyl S-benzylthioacetimidate in 12 ml. of 1,2-dimethoxyethane was heated under reflux for eight hours. At the end of this time, it was treated with 22 ml. of 0.47 N aqueous sodium hydroxide solution (0.01 mole NaOH) and refluxing was continued for an additional hour thereafter. The reaction mixture was then cooled, further diluted with 10–20 ml. of water and filtered. Upon acidification of the resulting filtrate with dilute hydrochloric acid, there was obtained a crystalline precipitate which was subsequently collected by means of suction filtration and air-dried to constant weight. In this manner, there was obtained a 1.4 g. (32%) yield of 3-benzylthiomethyl-6-chloro-7-sulfamyl - 1,2,4,-benzothiadiazine-1,1-dioxide, M.P. 228–232° C. Mixed melting point determinations, infrared spec roscopy analysis and paper chromatography all showed this material to be substantially identical with that of an authentic sample.

EXAMPLE XI

The procedure described in Example X is followed to prepare the following compounds from the appropriate 4-substituted-6-fluoro-1,3-disulfamylbenzene starting materials, using as reactant in each case the appropriate imidate esters reported previously in Examples I–II:

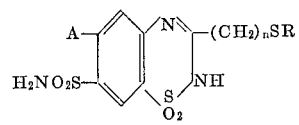

| A | $(CH_2)_n$ | R |
|---|---|---|
| $CF_3$ | $-CH_2-$ | $CH_3$ |
| $NO_2$ | $-CH_2CH_2-$ | n—$C_3H_7$ |
| Br | $-CH_2CH_2CH_2-$ | $CH_2=CH-$ |
| Cl | $-CH_2-$ | $CH_2=CH-CH_2-$ |
| H | $-CH_2CH_2$ | $CF_3CH_2-$ |
| $OC_2H_5$ | $-CH_2CH_2CH_2-$ | $CH_2Cl$ |
| n—$C_3H_7$ | $-CH_2-$ | $CH_2CH_2F$ |
| $NO_2$ | $-CH_2CH_2CH_2-$ | Cyclo—$C_2H_5$ |
| Br | $-CH_2-$ | Cyclo—$C_4H_7$ |

| A | $(CH_2)_n$ | R |
|---|---|---|
| Cl | $-CH_2CH_2-$ | Cyclo-$C_6H_{11}$ |
| H | $-CH_2CH_2CH_2-$ | α-$C_{10}H_7$ |
| $OCH_3$ | $-CH_2-$ | β-$C_{10}H_7$ |
| $CH_3$ | $-CH_2CH_2-$ | $C_6H_5CH_2$ |
| $CF_3$ | $-CH_2CH_2CH_2-$ | p-$ClC_6H_4CH_2$ |
| $NO_2$ | $-CH_2-$ | p-$CH_3OC_6H_4CH_2$ |
| Br | $-CH_2CH_2$ | p-$C_3H_7OC_6H_4CH_2$ |
| Cl | $-CH_2CH_2CH_2-$ | β-$C_6H_5C_2H_4$ |
| H | $-CH_2-$ | m-$C_6H_4(CH_3)_2$ |
| Cl | $-CH_2-$ | $C_2H_5$ |

In like manner, the following compounds are prepared by merely employing the appropriate imidate ester $$[Z-C(=NH)X]$$

in each case, as indicated below, instead of using those previously reported:

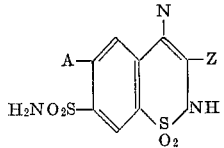

| X | A | Z |
|---|---|---|
| $OCH_3$ | Cl | H |
| $OC_2H_5$ | $OC_2H_5$ | $CH_3$ |
| $OC_3H_7(iso)$ | n-$C_3H_7$ | $C_2H_5$ |
| $OC_4H_9$ | $CF_3$ | n-$C_6H_{13}$ |
| $OC_5H_{11}(iso)$ | $NO_2$ | $CH_2Cl$ |
| $OC_6H_{13}$ | H | $CH_2CH_2F$ |
| $OCH_3$ | Br | Cyclo-$C_3H_5$ |
| $OC_2H_5$ | Cl | Cyclo-$C_5H_9$ |
| $OC_3H_7$ | $CH_3$ | $C_6H_5$ |
| $OC_4H_9$ | $CH_3$ | $C_6H_5CH_2$ |
| $OCH_3$ | $CF_3$ | γ-$C_6H_5C_3H_6$ |
| $OC_2H_5$ | $NO_2$ | Cyclo-$C_3H_5(CH_2)$ |
| $OCH_3$ | Cl | Cyclo-$C_5H_6(CH_2)$ |
| $OCH_3$ | Br | Cyclo-$C_6H_{11}(C_3H_6)$ |
| $OC_3H_7$ | $OCH_3$ | Bicyclo[2.2.1]hept-5-en-2-yl |
| $OCH_3$ | H | Bicyclo[2.2.1]hept-2-yl |
| $OC_2H_5$ | Cl | $(CH_3)_2CHCH_2$ |

In all these cases, the yields obtained are substantially of the same order of magnitude as that previously reported in the preceding example for 3-benzylthiomethyl-6-chloro-7-sulfamyl - 1,2,4 - benzothiadiazine-1,1-dioxide.

EXAMPLE XII

To a suspension of 2.89 g. (0.01 mole) of 4-chloro-6-fluoro-1,3-disulfamylbenzene in 12 ml. of 1,2-dimethoxyethane there were added 2.21 g. (0.011 mole) of ethyl S-(2,2,2,-trifluoroethyl)thiomethylacetimidate, and the resulting mixture was heated to reflux overnight (~16 hours) on a steam bath. Most of the solvent was then removed from the mixture by means of evaporation under reduced pressure, and 30 ml. of 0.47 N sodium hydroxide was subsequently added thereto (i.e., about 0.015 mole of sodium hydroxide) with constant agitation being maintained throughout the addition step. Stirring was then continued overnight at room temperature (~25° C.) for about 16 hours. The resulting aqueous solution was then extracted with two-100 ml. portions of diethyl ether, and the treated aqueous layer thus obtained was added slowly to a dilute hydrochloric acid solution. In this manner, there was obtained 3-(2,2,2-trifluoroethyl)thiomethyl-6-chloro-7-sulfamyl-1,2,4-benzothiadiazine-1,1-dioxide as a crystalline precipitate, weighing 1.40 g. or 33% of the theoretical after subsequently being collected and air-dried. Recrystallization from ethanol-diethyl ether then gave an analytically pure sample, M.P. 254–255° C.

*Analysis.*—Calcd. for $C_{10}H_9ClF_3N_3O_4S_3$: C, 28.34; H, 2.14; N, 9.91. Found: C, 28.55; H, 2.20; N, 9.78.

EXAMPLE XIII

The procedure described in Example XII is followed to prepare the same compounds listed as products in Example XI by merely employing the appropriate 6-fluoro-1,3-disulfamylbenzene compound and imidate ester as the respective starting materials in each case. The yields obtained in each instance are of substantially the same order of magnitude as those previously afforded by the procedure of Examples X–XI.

EXAMPLE XIV

The procedure described in Example X is followed except that calcium hydroxide is employed in place of sodium hydroxide on an equimolar basis in the final base treatment step with substantially the same results being obtained.

In like manner, lithium hydroxide, strontium hydroxide, potassium hydroxide and barium hydroxide each afford substantially the same results when used in place of sodium hydroxide on an individual equimolar basis.

EXAMPLE XV

A solution consisting of 2.89 g. (0.01 mole) of 4-chloro-6-fluoro-1,3-disulfamylbenzene and 1.80 g. (0.01 mole) of S-benzylthioacetamidine dissolved in 12 ml. of 1,2-dimethoxyethane was allowed to reflux overnight for about 16 hours. At the end of this time, the evolution of ammonia from the reaction mixture was complete. The resulting solution was then treated with 22 ml. of 0.47 N aqueous sodium hydroxide (0.01 mole NaOH) solution at the reflux temperature for a period of one hour and thereafter, cooled and diluted with 10–15 ml. of water. Upon addition of the latter solution to a well-stirred and chilled dilute hydrochloric acid solution in a dropwise manner, there was obtained a crystalline precipitate of 3 - benzylthiomethyl - 6 - chloro - 7 - sulfamyl - 1,2,4-benzothiadiazine-1,1-dioxide which, after being subsequently collected and air-dried, weighed 1.48 g. (35%) and melted at 230–233° C. As in Example X, mixed melting point determinations, infrared absorption spectroscopy and paper chromatography techniques all revealed this material to be substantially identical with that of an authentic sample.

EVAMPLE XVI

The procedure described in Example XV is followed to prepare the same compounds listed as products in Example XI by merely employing the appropriate 6-fluoro-1,3-disulfamylbenzene compound and amidine reagent as the respective starting materials in each case. The yields obtained are of substantially the same order of magnitude as that previously reported in the preceding example for the subject compound therein.

EXAMPLE XVII

To a suspension of 2.89 g. (0.01 mole) of 4-chloro-6-fluoro-1,3-disulfamylbenzene in 12 ml. of 1,2-dimethoxyethane there were added 1.89 g. (0.011 mole) of 3-(2,2,2-trifluoroethyl)thioacetamidine, and the resulting solution was heated to reflux overnight (~16 hours). The reaction mixture was then cooled down somewhat, while 31 ml. of 0.47 N sodium hydroxide (0.015 mole NaOH) solution were added thereto. The resulting solution was then heated on a steam bath for two hours. On cooling to room temperature (25° C.), it was subsequently extracted with diethyl ether (two-100 ml. portions) and the resultant aqueous layer separated and added to a dilute hydrochloric acid solution to give a crystalline precipitate. The latter was then subsequently collected by means of suction filtration and air-dried to constant weight to afford 1.2 g. (29%) of 3-(2,2,2-trifluoroethyl)thiomethyl - 6 - chloro - 7 - sulfamyl - 1,2,4 - benzothiadiazine-1,1-dioxide. After recrystallization from acetone, the analytical sample melted at 254–255° C.

*Analysis.*—Calcd. for $C_{10}H_9ClF_3N_3O_4S_3$: C, 28.34; H, 2.14; N, 9.91. Found: C, 28.55; H, 2.35; N, 9.78.

EXAMPLE XVIII

The procedure described in Example XV is followed except that calcium hydroxide is employed in place of sodium hydroxide on an equimolar basis in the final base treatment step with substantially the same results being obtained.

In like manner, lithium hydroxide, strontium hydroxide, potassium hydroxide and barium hydroxide afford substantially the same results when used in place of sodium hydroxide on an individual equimolar basis.

EXAMPLE XIX

A solution consisting of 1.44 g. (0.005 mole) of 4-chloro-6-fluoro-1,3-disulfamylbenzene and 1.80 g. (0.01 mole) of S-benzylthioacetamide in 10 ml. of 1,2-dimethoxyethane was refluxed for two and one-half hours. At the end of this time, the reaction mixture was cooled to room temperature (~25° C.), filtered and the filtrate subsequently concentrated to dryness under reduced pressure. The residue so obtained was then treated with 10% aqueous sodium carbonate solution, filtered and the resulting filtrate acidified with 6 N hydrochloric acid to afford a crystalline material as precipitate. Upon recrystallization from methanol, pure 3-benzythiomethyl-6-chloro-7-sulfamyl-1,2,4-benzothioadiazine-1,1-dioxide was the product obtained.

EXAMPLE XX

The procedure described in Example XIX is followed to prepare the same compounds listed as products in Example XI by merely employing the appropriate 6-fluoro-1,3-disulfamylbenzene compound and amidine reagent as the respective starting materials in each case.

EXAMPLE XXI

The procedure described in Example XIX is repeated only this time employing an equivalent amount in moles of ethyl S-benzylthioacetimidate in place of the S-benzylthioacetamidine reagent previously used. The results obtained in this particular case are substantially the same as in Example XIX.

In like manner, this same procedure is also followed to prepare the other compounds listed as products in Example XI by merely employing the appropriate amounts of the corresponding 6 - fluoro - 1,3 - disulfamylbenzene starting compound and imidate ester reagent in each case.

What is claimed is:

1. A compound selected from the group consisting of organic bases of the formula:

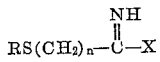

and the acid addition salts thereof wherein R is selected from the group consisting of lower alkenyl, lower fluoroalkyl, lower chloroalkyl, cycloalkyl containing up to 6 carbon atoms, monochlorobenzyl, mono-(lower alkoxy)benzyl and β-phenylethyl, $n$ is an integer of from 1 to 3 inclusive and X is selected from the group consisting of amino and lower alkoxy.

2. A compound as claimed in claim 1 wherein R is 2,2,2-trifluoroethyl and X is lower alkoxy.

3. A compound as claimed in claim 1 wherein R is 2,2,2-trifluoroethyl and X is amino.

4. Ethyl S-(2,2,2-trifluoroethyl)thioacetimidate.

5. S-(2,2,2-trifluoroethyl)thioacetamidine.

References Cited

UNITED STATES PATENTS

| 2,149,473 | 3/1939 | Sonn | 260—453 X |
| 2,516,108 | 7/1950 | Djerassi et al. | 260—564 X |
| 2,811,526 | 10/1957 | Burtner | 260—453 X |
| 3,147,270 | 9/1964 | Anderson | 260—453 X |
| 3,203,550 | 8/1965 | Schnefer | 260—453 X |

OTHER REFERENCES

Burger: "Medicinal Chemistry," 2nd ed., pp. 77–78 and 599 (1960).

Craver et al.: "Jour. Pharmacol. Exptl. Therapy," vol. 99, pp. 353–61 (1960).

CHARLES B. PARKER, *Primary Examiner.*

ROBERT V. HINES, *Assistant Examiner.*

U.S. Cl. X.R.

167—65; 260—464, 465, 465.1, 465.2, 465.7 465.9, 501.14, 505, 543, 556, 557, 558, 561, 564